United States Patent [19]

Newby et al.

[11] Patent Number: 5,097,486
[45] Date of Patent: Mar. 17, 1992

[54] PIPELINED DECISION FEEDBACK DECODER

[75] Inventors: Paul S. Newby, Toronto, Canada; Dan E. Bower, Newark, Calif.

[73] Assignee: Ampex Corporation, Redwood City, Calif.

[21] Appl. No.: 562,305

[22] Filed: Jul. 31, 1990

[51] Int. Cl.⁵ .................... H03D 1/00; H04L 25/06
[52] U.S. Cl. ........................ 375/76; 375/94; 371/37.9
[58] Field of Search ............... 375/76, 94; 371/37.9; 307/359; 328/116

[56] References Cited

U.S. PATENT DOCUMENTS

| | | | |
|---|---|---|---|
| 3,125,727 | 3/1964 | Sharp | 328/116 |
| 3,214,700 | 10/1965 | Hook | 375/76 |
| 3,634,769 | 1/1972 | Sleater et al. | 328/103 |
| 3,898,572 | 8/1975 | Kato | 328/103 |
| 4,012,697 | 3/1977 | Ballinger | 375/110 |
| 4,344,039 | 8/1982 | Sugiura et al. | 375/94 |
| 4,371,975 | 2/1983 | Dugan | 307/516 |
| 4,387,465 | 6/1983 | Becker | 375/76 |
| 4,543,531 | 9/1985 | Sugita et al. | 375/80 |
| 4,546,394 | 10/1985 | Yamamoto | 360/53 |
| 4,639,792 | 1/1987 | Moxon | 358/335 |
| 4,697,098 | 9/1987 | Cloke | 307/354 |
| 4,703,282 | 10/1987 | Yoshida | 329/50 |
| 4,707,666 | 11/1987 | Pfeifer et al. | 329/110 |
| 4,852,126 | 7/1989 | Tanaka et al. | 375/76 |

Primary Examiner—Benedict V. Safourek
Assistant Examiner—Young Tse
Attorney, Agent, or Firm—Elizabeth E. Strnad; George B. Almeida

[57] ABSTRACT

The decision feedback decoder of the invention receives sequentially sampled values of a signal waveform corresponding to data bits transmitted by a channel. A magnitude comparator compares the sampled values to a threshold and based on each comparison it provides subsequent decisions determining the values of the corresponding data bits. A predetermined number of previous decisions are stored and applied to a first and a second threshold adjustment circuit. Each circuit adjusts the threshold depending on the respective values of the previous decisions, while the first circuit provides the adjustment based on an assumption that the next decision to be made will have a first signal value and the second circuit provides the adjustment based on an assumption that the next decision will have a second signal value. When that next decision becomes available, it is utilized to select the correct adjusted threshold value for the next comparison by the magnitude comparator.

9 Claims, 6 Drawing Sheets

PIPELINED DECISION FEEDBACK DECODER

This invention relates generally to detection of digital data which has been transmitted over a channel, and more particularly to high speed decision feedback decoders utilized for decoding of such data.

BACKGROUND OF THE INVENTION

Data which has been transmitted over a channel, for example telephone line, microwave, satellite, or magnetic recording/playback channel may be distorted in the process of transmission such that adjacent data bits interfere with each other. As a result, even in the absence of noise or other disturbance, samples of the received signal taken with a clock synchronous with the data clock no longer correspond to the input data. This interference, generally referred to as intersymbol interference, may be linear or nonlinear, and will increase the likelihood of incorrect data decoding in the receiver.

According to well known signal detection practices, the received signal is sampled at the data clock rate, and the amplitude value of each obtained sample is compared to a threshold. When the amplitude value exceeds the threshold, it is detected as a binary one, otherwise it is detected as a binary zero. Because of the effect of the above-indicated channel transfer characteristics, the amplitude of the samples varies with the particular transmitted data pattern, due to intersymbol interference. Decision feedback decoders are known to be utilized to compensate for the intersymbol interference. In these decoders a known number of bits previously detected by the decoder, generally referred to as previous decisions, are fed back and stored. The known decision feedback decoders provide a correction value based on the previous decisions and particular channel characteristics, and adjust the threshold accordingly before making a next decision. The next decision is obtained by comparing the next received sample value to the adjusted threshold, thereby compensating for the intersymbol interference.

In applications where it is essential to transmit and decode data at a high rate, decision feedback decoders operating at a desired high speed are necessary. However, known decision feedback decoders are required to perform two basic operations in succession during each decision making step. These two sequential operations are: adjusting the threshold to compensate for the intersymbol interference, and comparing a newly received sample value to the adjusted threshold. Therefore, the operation speed of the decision making process is limited by a total delay obtained as a sum of operation delays effected by each circuit portion utilized for performing these sequential operations.

SUMMARY OF THE INVENTION

The decision feedback decoder of the invention accelerates the decision making process by utilizing two loops in a pipelined arrangement. The first loop has two threshold adjustment circuits operating in parallel. The first loop stores a predetermined number of previous decisions and applies the stored decisions to each threshold adjustment circuit simultaneously. Both threshold adjustment circuits adjust the threshold level based on these previous decisions. However, in accordance with an important feature and advantage of this invention, one of these circuits adjusts the threshold based on a first one of two possible predetermined signal values being assigned to the next decision in succession, while the other circuit adjusts the threshold based on a second one of two possible predetermined signal values being assigned to the next decision. Both thusly adjusted threshold values are provided simultaneously and stored at the output of each threshold adjustment circuit.

The second loop has a magnitude comparator which receives the samples of the transmitted input signal and compares each sample value to the adjusted threshold value. When the sample value exceeds the threshold, the magnitude comparator outputs a decision having the above-indicated first predetermined signal value, otherwise it outputs a decision equal to the above-indicated second predetermined signal value. The second loop also has a storage device for storing the next decision in sequence provided by the magnitude comparator. The actual value of the next decision is utilized to select the correct adjusted threshold value from the stored alternative threshold values. The selected correct adjusted threshold value is applied to the magnitude comparator for the next comparison.

Because of the use of simultaneously operating two loops, the decision feedback decoder of the invention significantly reduces the time necessary for the decision making process. Particularly, each loop provides one of the two basic operations, namely threshold adjustment and threshold comparison, substantially simultaneously, thereby reducing the total signal processing delay by approximately one half. Because of the simultaneous operations by both loops and the feature of determining the respective adjusted threshold values for alternative values of the next decision before that decision is actually made, the decision feedback decoder in accordance with the present invention is referred to as "pipelined".

The system of the invention has a further important advantage that it does not require an increased memory space. The total memory space required for both threshold adjustment circuits is substantially the same as that used by the slower prior art systems.

DETAILED DESCRIPTION

Figure 1:
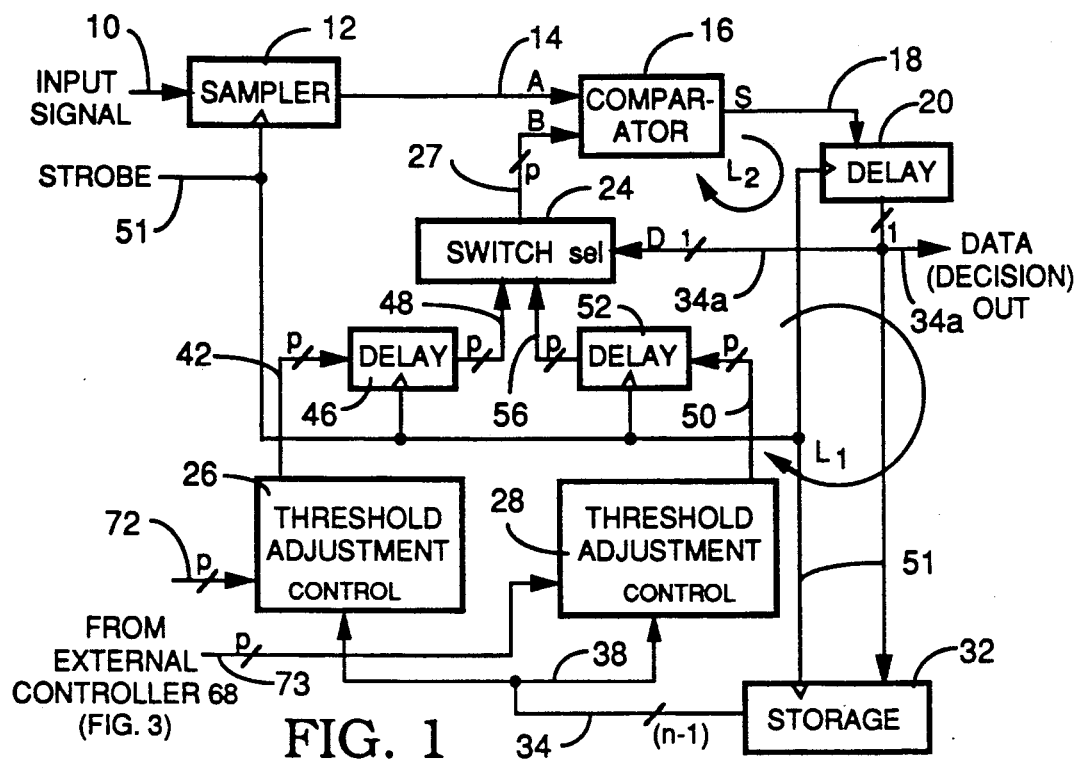
FIG. 1 is a simplified block diagram of a pipelined decision feedback decoder in accordance with the principle of the present invention.

To facilitate comparison between the hereby attached circuit diagrams, timing diagrams and flow charts, corresponding circuit elements as well as signal waveforms occurring at various locations in the circuit diagram, are designated by corresponding reference characters in all the drawing Figures.

FIG. 1 shows a simplified block diagram of the decision feedback decoder in accordance with the present invention, and it will be now described briefly. The digital signal which has been transmitted over a channel is received in the form of an analog signal on line 10. That signal is sampled by circuit 12, synchronously with strobe pulses applied on line 51, in a well known manner. The decoder has two loops L1 and L2. Loop L2 comprises a magnitude comparator 16, a delay 20, and a switch 24. The magnitude comparator 16 has two inputs A and B. It compares each sample on line 14, received at its input A, to a threshold on line 27, received at its input B via switch 24. The output from the magnitude comparator 16 is the decision provided by the decision feedback decoder. That decision is applied via line 18 to delay 20, and the delayed decision is applied via line 34a to the control input of the switch 24.

In accordance with an important feature of the invention, loop L1 comprises two parallel threshold adjustment circuits 26, 28, and a storage circuit 32. Circuits 26, 28 may be implemented for example as adjustable filters, and the storage circuit 32, may be implemented for example as a tapped delay circuit. Circuit 32 stores a predetermined number of previously made decisions and applies the stored decisions as inputs to the threshold adjustment circuits 26, 28 to adjust the threshold value depending on these previous decision values and the known transmission channel characteristics, to compensate for the intersymbol interference, as it will be described in more detail with reference to the preferred embodiment of the invention.

The block diagram of the preferred embodiment of the invention shown in FIG. 2 will now be described. The decision feedback decoder of FIG. 2 receives on line 10 a signal which has been transmitted over a channel, for example a magnetic recording/playback channel. An analog-to-digital (A/D) converter 12 samples the signal on line 10, synchronously with a clock signal applied on line 51, and it converts the analog samples to digital sample values in a manner well known in the art. The decoder of FIG. 2 has two loops L1, L2. Loop L2 comprises a magnitude comparator 16, which compares each digital sample on line 14 to a threshold, a flip-flop 20, and a first multiplexer 24. The magnitude comparator 16 has a first input A connected to line 14 from the A/D converter 12, and a second input B connected to the multiplexer 24 via line 27. An output of the magnitude comparator 16 is connected via line 18 to flip-flop 20, whose output is connected via line 34a to a select input of multiplexer 24.

Loop L1 comprises two parallel logic circuits 26, 28, which in the preferred embodiment are implemented by random access memories (RAM 1 and RAM 2), and which provide the threshold adjustment to compensate for the above-described intersymbol interference. A shift register 32 stores a predetermined number (n-1) of previously made decisions and applies the stored decisions as inputs to the logic circuits 26, 28 via a second multiplexer 36. The logic circuits 26, 28 adjust the threshold value depending on these previous decision values and the known transmission channel characteristics, as will be described in more detail. The input of shift register 32 is connected to the output of flip-flop 20 and the output of the shift register 32 is connected via line 34 to an input of the second multiplexer 36. The output of multiplexer 36 is connected via line 38 to each logic circuit 26, 28. In the preferred embodiment line 38 represents address lines for addressing the RAMs 26, 28. The respective output signals from each logic circuit are applied to flip-flops 46, 52, respectively, and therefrom via lines 48, 56 to respective inputs of the first multiplexer 24.

Figure 3:
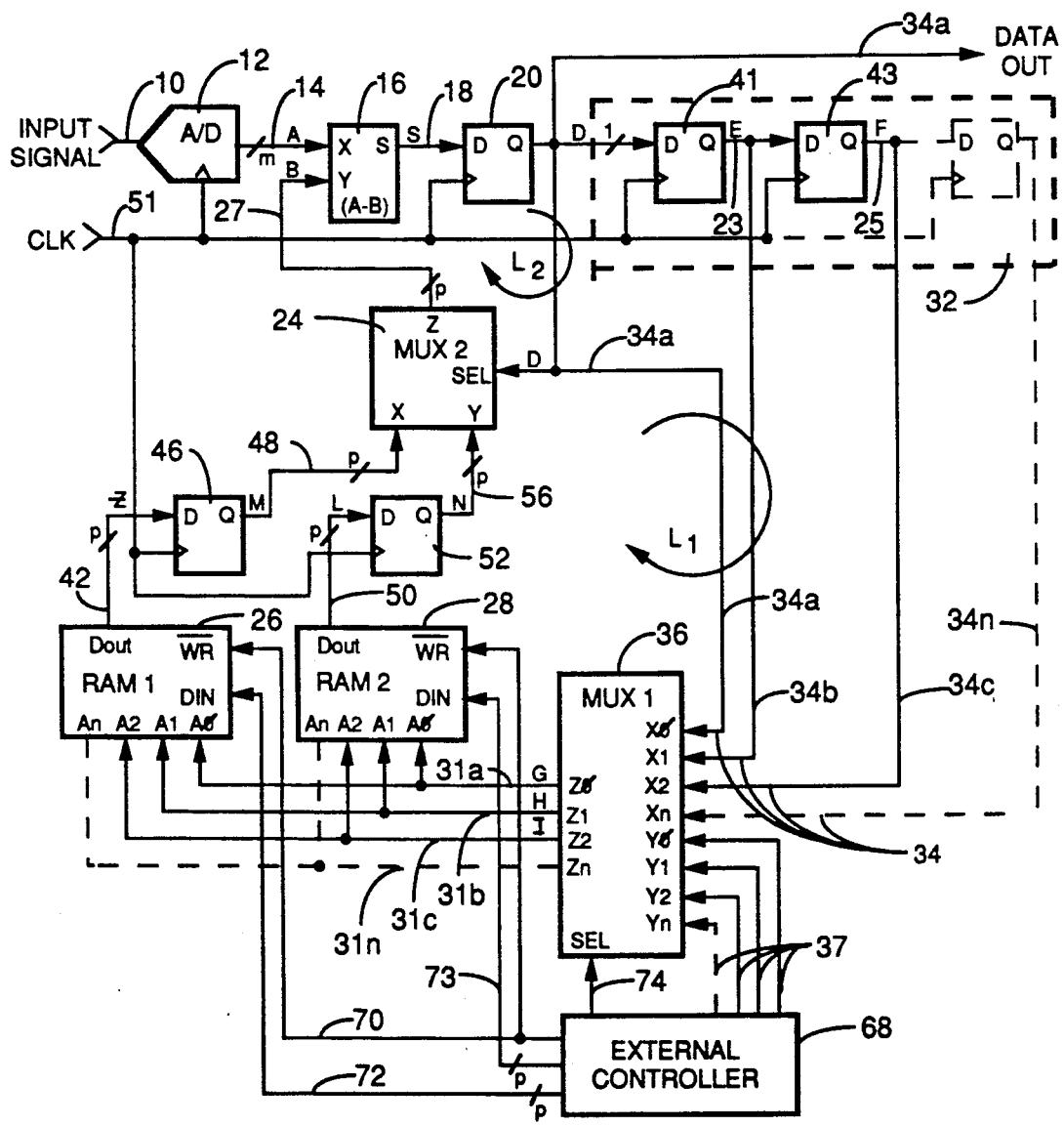
FIG. 3 is a more detailed circuit diagram corresponding to the block diagram of FIG. 2.

An external controller, shown at 68 in FIG. 3, is utilized to enter new data into the RAMs 26, 28 via lines 72, 73 when a control signal on line 70 from the external controller is enabled. A select signal from controller 68 is applied on line 74 to multiplexer 36 to select address lines 34, 37 respectively.

Figure 2:
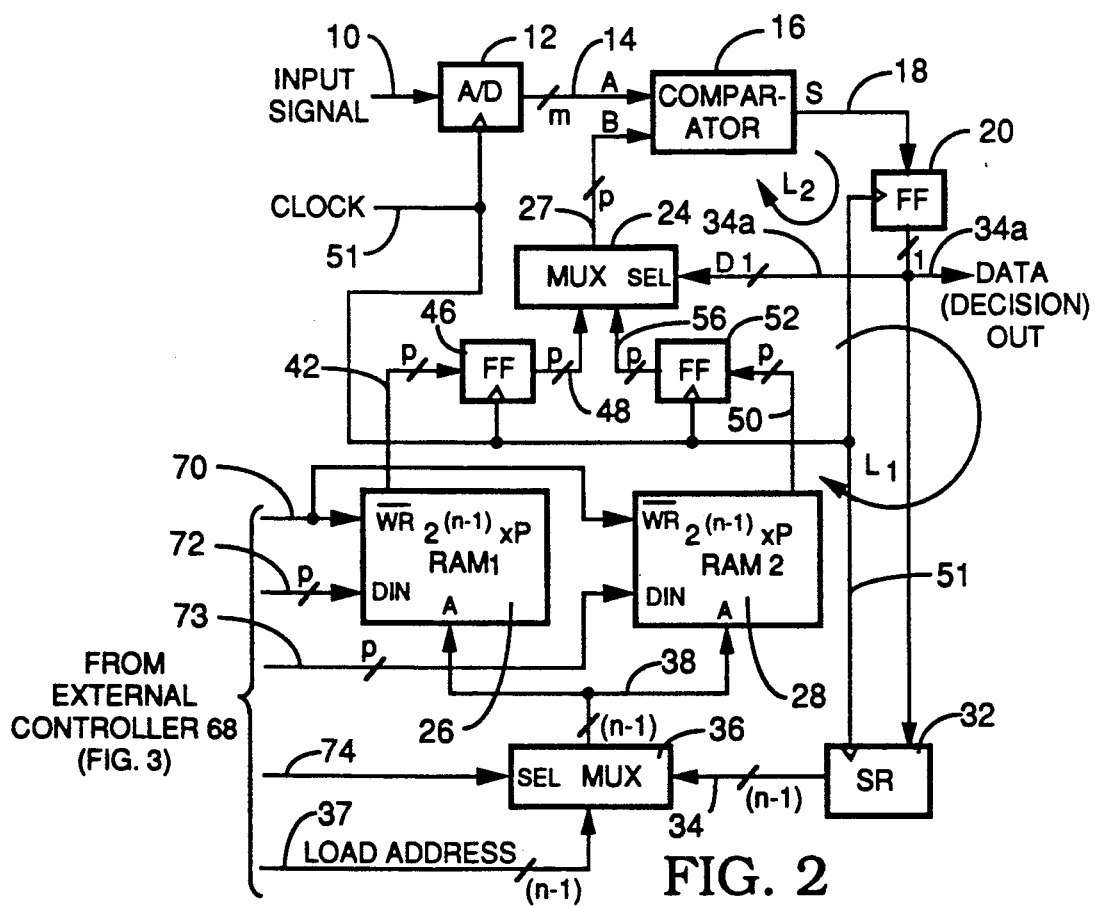
FIG. 2 is a simplified block diagram of a pipelined digital decision feedback decoder in accordance with the preferred embodiment of the invention.
Figure 4A:
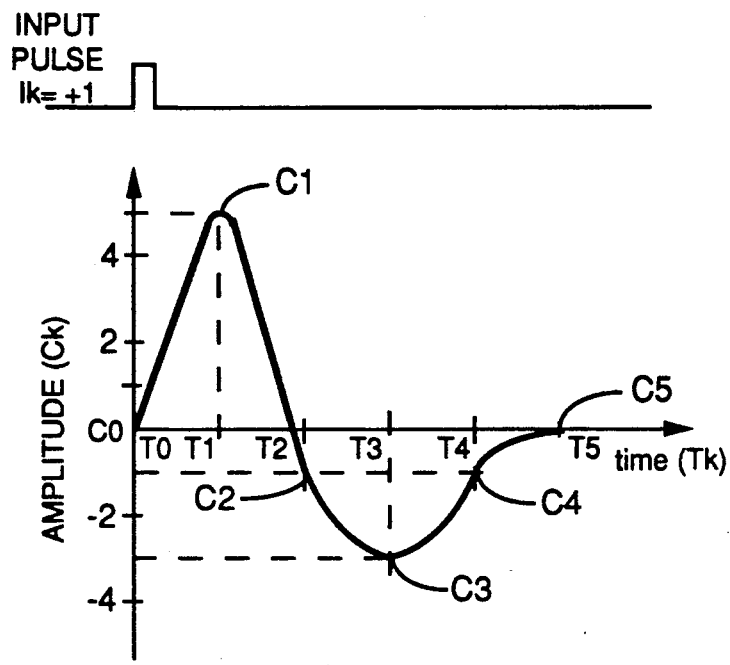
FIGS. 4A and 4B show examples of particular transmission channel responses to a positive and negative input pulse.
Figure 4B:
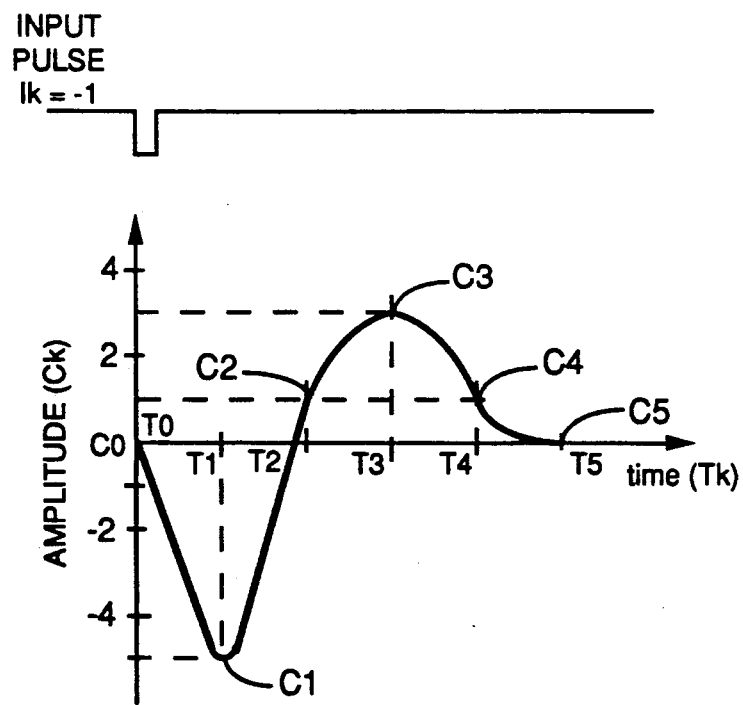

In FIG. 2 the input signal received on line 10 is being transmitted by a data transmission channel, for example a magnetic recording and playback channel, as it is well known in the art. To facilitate description of the operation of the preferred embodiment, an example of a transmission channel characteristic corresponding to that particular transmission channel is shown in FIGS. 4A and 4B. As has been previously mentioned, the channel response causes intersymbol interference of the input data bits transmitted thereby. To simplify the description of the preferred embodiment, linear intersymbol interference will be assumed in this example. It is noted however, that the present invention may also be utilized to reduce the effect of nonlinear intersymbol interference on the decoded data.

With further reference to FIG. 4A it shows an example of a particular amplitude response of a transmission channel in time domain, to a single positive input pulse $Ik = +1$, representing a binary one, and FIG. 4B shows a response to a single negative input pulse $Ik = -1$, representing a binary zero. Along the time axis there are plotted particular points in time T0 to Tn occurring at timing intervals, which in the preferred embodiment correspond to clock cycles utilized to synchronize the operation of the decoder, as it will follow from the description below.

As is seen from FIG. 4A, when a positive pulse $Ik = +1$ is applied to the transmission channel at time T0, it provides an increasing amplitude from $C0=0$ at T0, to a peak $C1=5$ at time T1. Thereafter the amplitude decreases to $C2=-1$ at time T2, and continues to decrease until time T3, when it has a negative peak $C3=-3$. The amplitude thereafter increases towards less negative values, and reaches $C4=-1$ at time T4, and then $C5=0$ at T5, whereafter it stays at zero. The channel response to a negative input pulse $Ik=-1$ is shown in FIG. 4B. It is seen that the amplitude values in FIG. 4B have the same magnitude but opposite sign, that is they are inverted, with respect to the values shown in FIG. 4A. To facilitate further description, the respective amplitude values C0 to C5 at respective points in time T0 to T5 for the channel response to $Ik=+1$ shown in FIG. 4A, are depicted in TABLE A below. It will be understood that in this example the amplitude values C0 to C5 have been deliberately selected as integers to facilitate the description. An actual channel response obtained by measurement will likely have non-integer amplitude values.

TABLE A

| Time (Tk) | T0 | T1 | T2 | T3 | T4 | T5 |
|---|---|---|---|---|---|---|
| ADJUSTMENT (Ck) for Ik = +1 | | | | | | |
| 1) C0 | 0 | | | | | |
| 2) C1 | | +5 | | | | |

TABLE A-continued

| Time (Tk) | T0 | T1 | T2 | T3 | T4 | T5 |
|---|---|---|---|---|---|---|
| 3) C2 | | | −1 | | | |
| 4) C3 | | | | −3 | | |
| 5) C4 | | | | | −1 | |
| 6) C5 | | | | | | 0 |

As it is seen from FIGS. 4A, 4B and TABLE A, in this example there is a one clock cycle delay between the input and output of the transmission channel, and each amplitude peak $C1=5$ or $C1=-5$ at T1 corresponds to an input pulse $Ik=+1$ or $Ik=-1$, respectively. As it is well known in the art, a transmission channel having an ideal response would transmit each input pulse unchanged. Consequently, an ideal channel would have no intersymbol interference at the moment of sampling by a clock signal synchronous with the input data clock. Assuming that no other interference or noise exists, any deviation from such ideal output is due to intersymbol interference, as shown in FIGS. 4A, 4B.

Figure 5:
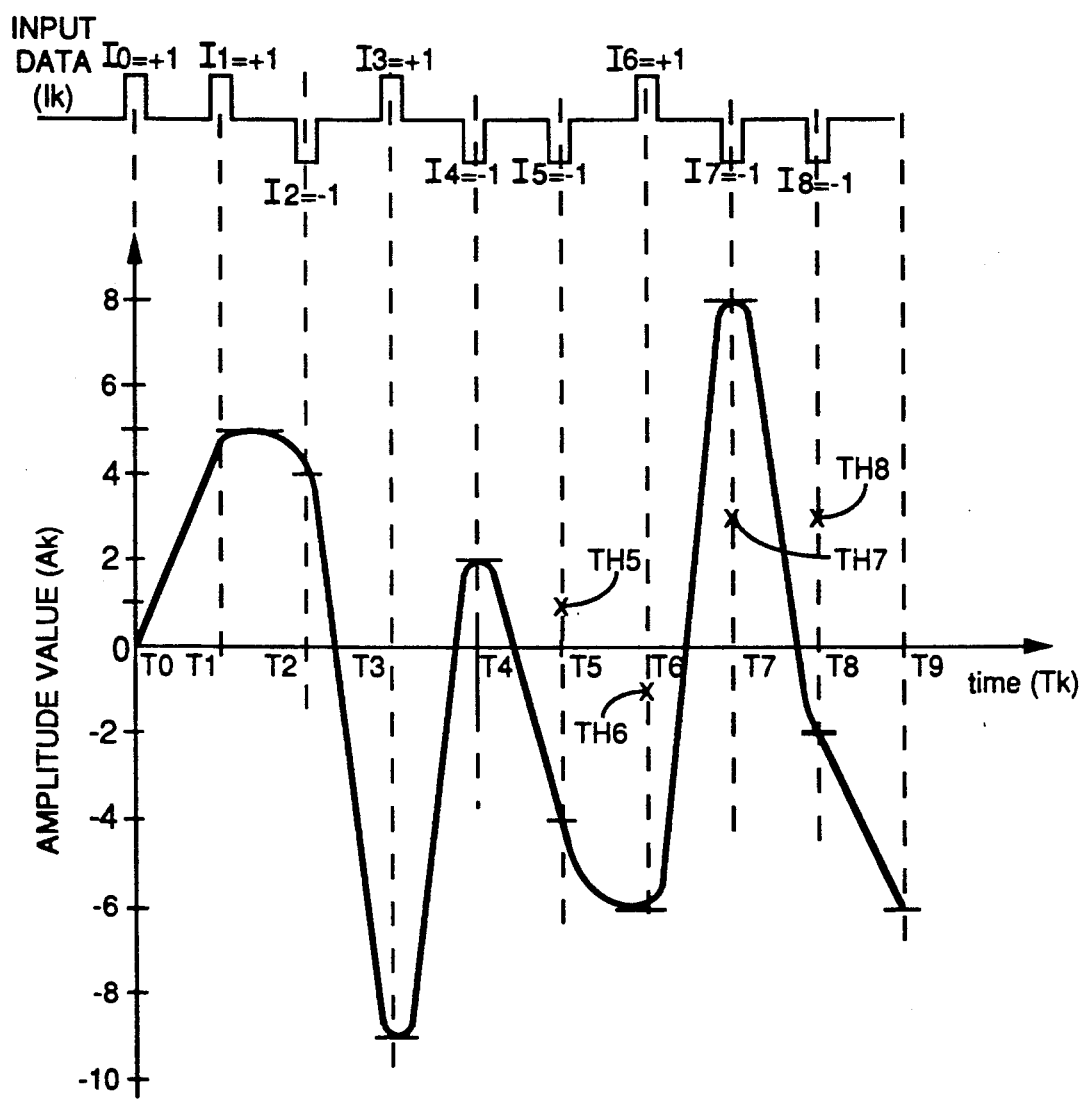
FIG. 5 shows an example of a response by the transmission channel of FIGS. 4A, 4B to a particular input pulse sequence.

An example of a response provided by the above described transmission channel to a sequence of input pulses $Ik=I0$ to $I8$ will be described with reference to FIG. 5 and TABLE B, shown below. Due to the intersymbol interference the amplitude values $Ak=Ak0$ to $Ak8$ at any point in time $Tk=T0$ to $T8$ will be influenced by the previously described channel response values Ck to the previously transmitted pulses by the channel. Therefore at each point in time Tk the resulting amplitude Ak is obtained as a superposition of amplitudes Ck, resulting from the particular channel response to particular pulses previously transmitted by the channel. As it will follow from further description, the decision feedback decoder of the preferred embodiment provides a threshold adjustment to compensate for the values Ck.

with corresponding values shown in the example of FIG. 5.

With further reference to TABLE B, horizontal row 1 shows time intervals T0 to T8, at which input pulses I0 to I8, indicated in row 2, are sequentially received by the transmission channel. Thus pulse $I0=+1$ is received received at time T0; pulse $I1=+1$ is received at time T1; pulse $I2=-1$ to a binary zero of the input data at the input of the channel. The samples received at the output of the channel, as shown in FIG. 5, corresponding to the above indicated input pulse sequence, result from the above-described intersymbol interference. The output samples are the result of superposition of the respective contributions of the signals shown in FIGS. 4A and 4B, resulting from each respective input pulse, as will be described below in more detail.

Rows 3 to 8 of TABLE B depict respective contributions Ck from a presently received pulse Ik, as well as from previously received pulses. As it is seen from comparison, rows 3 to 8 in TABLE B correspond to rows 1 to 6 of TABLE A. Because in the presently described embodiment there is a one interval delay of the response to an input pulse, the amplitude contribution C0 at a time Tk, in response to a pulse received at that time Tk is $C0=0$. C1 depicts the respective amplitude contributions obtained in response to an input pulse received at time $T(k-1)$, that is, preceding Tk by one time interval, and has a value of $+5$ or $-5$. C2 depicts the amplitude obtained in response to a pulse received at $T(k-2)$, that is preceding Tk by two time intervals, and it has a value $C2=-1$ or $+1$. The following amplitude C3 has a value $-3$ or $+3$, and C4 has a value of $-1$ or $+1$, while C5 has a zero value. It is seen from the channel pulse response depicted in FIGS. 4A, 4B and TABLE A, that in this paticular example each previous pulse contributes to the sampled signal amplitude only during four consecutive intervals, as it is also shown by the ampli-

TABLE B

| 1) TIME (Tk) | T0 | T1 | T2 | T3 | T4 | T5 | T6 | T7 | T8 |
|---|---|---|---|---|---|---|---|---|---|
| 2) INPUT DATA (Ik) | +1 | +1 | −1 | +1 | −1 | −1 | +1 | −1 | −1 |
| ADJUSTMENT (Ck) | ↓ | ↓ | ↓ | ↓ | ↓ | ↓ | ↓ | ↓ | ↓ |
| 3) C0 | 0 | 0 | 0 | 0 | 0 | 0 | 0 | 0 | 0 |
| 4) C1 | | +5 | +5 | −5 | +5 | −5 | −5 | +5 | −5 |
| 5) C2 | | | −1 | −1 | +1 | −1 | +1 | +1 | −1 |
| 6) C3 | | | | −3 | −3 | +3 | −3 | +3 | +3 |
| 7) C4 | | | | | −1 | −1 | +1 | −1 | +1 |
| 8) C5 | | | | | | 0 | 0 | 0 | 0 |
| 9) AMPLITUDE VALUE (Ak) | 0 | +5 | +4 | −9 | +2 | −4 | −6 | +8 | −2 |
| 9) ADJUSTED THRESHOLD (THk) | | | | | | +1 | −1 | +3 | +3 |

To facilitate the description of the channel response depicted in the example of FIG. 5, the various amplitude response values C0 to C4 from TABLE A are shown in TABLE B as contributing to the superposed amplitude value Ak at each point in time Tk. All the particular values given in TABLE B are correlated tude values C1 to C4 in TABLE B.

The actual amplitude value Ak at each point in time Tk, in response to the particular sequence of input pulses Ik is obatained as follows. The values in rows 3 to 8 in TABLE B are algebraically summed. The resulting sums Ak are indicated in row 9, and they represent the actual sample values corresponding to the signal waveform in FIG. 5 at the above-indicated times.

As a example, and with further reference to both FIG. 5 and TABLE B, the amplitude value Ak, for example at T5, is obtained as follows. The contribution of input pulse $I5 = -1$ received at T5 is $C0 = 0$; the contribution of the immediately preceding pulse $I4 = -1$ received at T4 is $C1 = -5$; the contribution of pulse $I3 = +21$ received at T3 is $C2 = -1$; the contribution of pulse $I2 = -1$ received at T2 is $C3 = +3$; and the contribution of pulse $I1 = +1$ received at T1 is $C4 = -1$. Thus at time T5 the value $A5 = -5 - 1 + 3 - 1 = -4$, as it is also seen from both TABLE B, row 9, and FIG. 5.

Now the operation of the preferred embodiment shown in FIG. 2 will be described briefly with reference to the timing diagram of FIG. 6. The analog samples on line 10 are converted to digital samples by A/D converter 12, at consecutive clock intervals Tk, and the resulting digital sample values A are applied on line 14. The magnitude comparator 16 compares each value A on line 14 with an adjusted digital threshold value B on line 27, as it will follow from further description. When A is greater than B, the resulting decision S on line 18 will be $S = +1$, otherwise it will be $S = -1$, where $+1$ corresponds to a logic 1 and $-1$ to a logic 0 value.

As has been previously described, both loops L1 and L2 operate simultaneously, thereby significantly shortening the operation cycle of the decoder. Thus while the magnitude comparator 16 of loop L2 provides a particular magnitude comparison, and it outputs a next decision Sn as a result of that comparison, the logic circuits 26, 28 of loop L1 calculate an adjusted threshold value based on a selected number (n-1) of previous decisions, applied thereto by the shift register 32. To accelerate the decision making process, in accordance with the teaching of the present invention, one of the logic circuits, for example 26, calculates and adjusted threshold value assuming that the next decision in succession will be $Sn = -1$, while the other logic circuit 28 calculates an adjusted threshold value assuming that the next decision will be $Sn = +1$. These respective decisions from each logic circuit are clocked into respective flip-flops 46, 52, and therefrom via lines 48, 56 to respective inputs of the multiplexer 24. When that next decision Sn is made by the magnitude comparator 16, it is output therefrom on line 18 and clocked via flip-flop 20 as a clocked decision Dn via line 34a to a selection input of multiplexer 24, as it is also depicted in the timing diagram of FIG. 6. Thus, the actual value Dn on line 34a selects the correct adjusted threshold value from the multiplexer 24. In response to the selection signal Dn on line 34a the multiplexer 24 applies the correct adjusted threshold value B therefrom via line 27 to the magnitude comparator 16 for the next comparison.

It follows from the foregoing description that a result of the simultaneous operation by both loops L1, L2, the operation of the decoder in accordance with the invention is significantly accelerated. It also follows from the above description that loop L1 provides two alternative threshold adjustment values, one for each of the two possible values of a next decision to be made, before that decision is actually available, and that based on the actual value of that next decision, loop L2 selects the correct adjusted threshold value for the next threshold comparison.

A more detailed circuit diagram of the preferred embodiment corresponding to the block diagram of FIG. 2 is shown in FIG. 3 and will be described now. The first and second logic circuit 26, 28 are preferably implemented as a random access memory which is divided into separately addressable and simultaneously accessible portions designated as RAM 1 and RAM 2. The shift register 32 comprises series connected flip-flops 41, 43, etc. Each flip-flop stores one previous decision. The previously described flip-flop 20 which stores the most recent decision Sn may be implemented as the first stage of the shift register 32. The stored decisions are fed back sequentially via lines 34a to 34c to respective first inputs X0 to X2 of multiplexer 36. It is understood that if more than three previous decisions are utilized, the number of series flip-flops in the shift register 32 may be extended, as it is indicated by dashed lines.

The magnitude comparator 16 is for example implemented as a binary adder. In the preferred embodiment each adjusted threshold value B is stored in RAM 1 and RAM 2 as a negative value $(-B)$. The value $(-B)$ on line 27 is added to value A by adder 16, to obtain a difference value $(A - B)$ on line 18. When the resulting difference value $(A - B)$ is greater than 0, the adder outputs on line 18 a value $S = +1$, corresponding to a logic 1 decision, otherwise the adder outputs a value $S = -1$, corresponding to a logic 0 decision. That decision is clocked via flip-flop 20, and the clocked decision D is applied on line 34a as previously described. The foregoing operation is also apparent from the timing diagram of FIG. 6.

An external controller 68 is utilized to insert new data into RAM 1 and RAM 2 via data lines 72, 73 and address lines 37 connected to second inputs Y0 to Yn of multiplexer 36. The new data represent adjusted threshold values, as may be necessary during start-up or operation. Read/write control line 70 and data input lines 72, 73 are connected from the external controller to the RAMs 26, 28. The respective outputs Zo to Zn of multiplexer 36 are connected via address lines 31a to 31n to address both RAMs 26, 28.

Now the operation of the preferred embodiment of the pipelined digital feedback decoder will be described with reference to the circuit diagram of FIG. 3 and the timing diagram of FIG. 6. To facilitate comparison, the respective letter designations of various signals shown at various locations in the circuit diagram correspond to those in the timing diagram.

A clock signal CLK received on line 51 is utilized to synchronize the operation of the various circuit elements shown in FIG. 3, as will follow from the description below. Thus the A/D converter 12 outputs digital sample values Ak on line 14 synchronously with the clock, as it is depicted by waveform A in FIG. 6. There is a slight delay between the beginning of each clock cycle and the occurrence of signal A on line 14 due to the operation delay of the A/D converter. To facilitate comparison, the respective amplitude values Ak in the previously described TABLE B are also depicted in the waveform A shown in FIG. 6.

Figure 6:
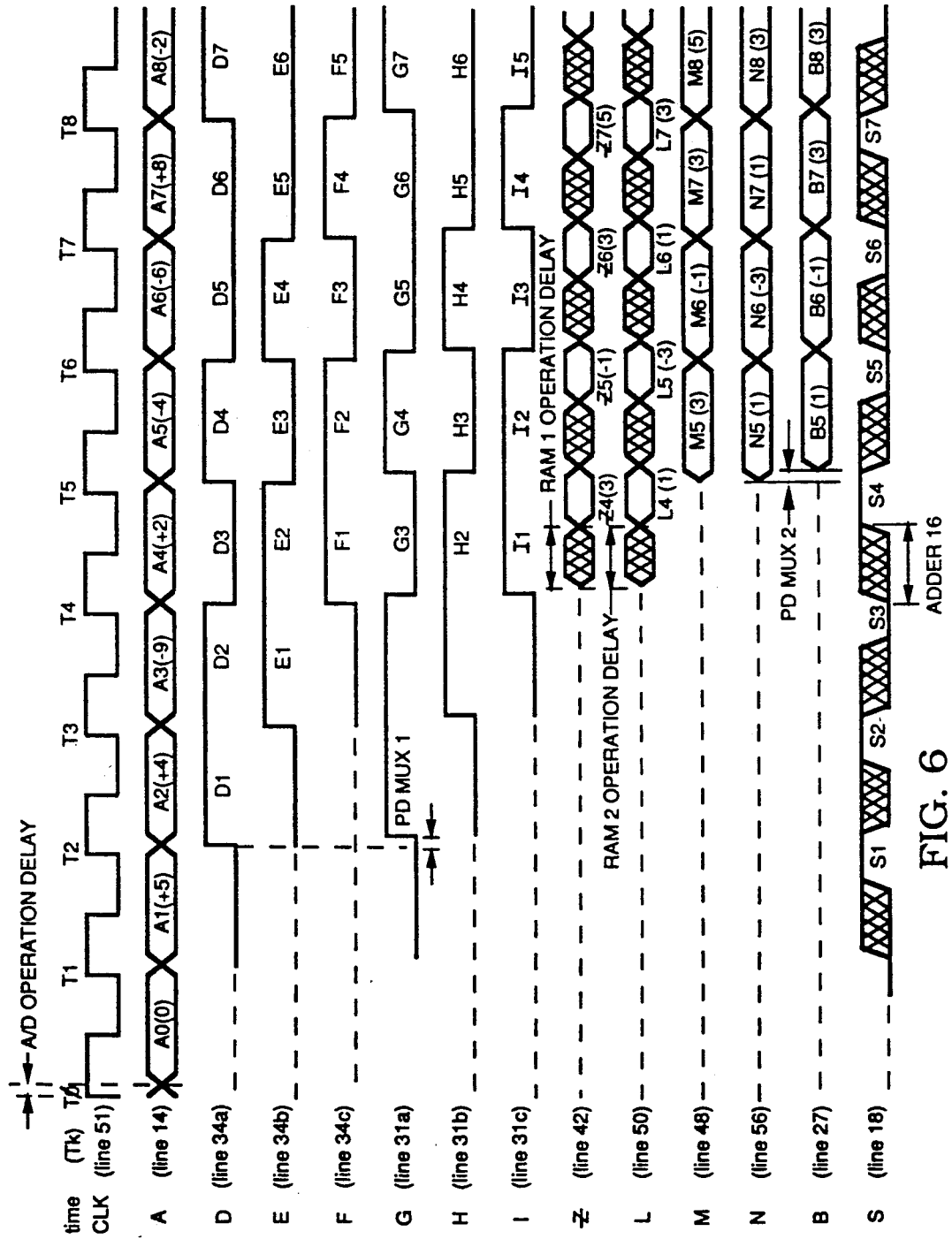
FIG. 6 shows timing diagrams of various signal waveforms occurring at different locations in the circuit diagram of FIG. 3.

As it is seen from FIGS. 3 and 6, in each particular point in time Tk the magnitude comparator 16 provides a comparison of a particular digital sample value Ak received on line 14 and a particular adjusted threshold value Bk on line 27. Depending on the result of that comparison, the magnitude comparator outputs a high or low decision Sk during the same clock cycle during which sample Ak has been received on line 14. Thus, it is seen from FIG. 6 that for example at clock T5 the digital sample value Ak is A5= −4, and that value is compared with the adjusted threshold value B5= +1. The algebraic sum of A5+B5= −3, which is less than zero, and therefore S5= −1, that is a logic low pulse. It is further seen from FIGS. 3 and 6 that at the next clock T6 the value S5 on line 18 is clocked via flip-flop 20 and it is output therefrom as the next clocked decision D5+= −1, corresponding to a logic low pulse.

Each subsequent decision provided by comparator 16 is clocked via flip-flop 20, and the clocked decision therefrom is output as the next decision D on line 34a. Decision D is further delayed by consecutive stages 41, 43, of the shift register 32, by one clock cycle each. The thusly delayed previous decisions are applied via lines 34a to 34c to respective first inputs X0 to X2 of multiplexer 36. These previous decisions D to F are applied by multiplexer 36 to both RAMs 26, 28 simultaneously as decisions G, H and I via lines 31a to 31c. As it is seen from FIG. 6, a slight propagation delay provided by multiplexer 36, causes a delay of signals G to I with respect to signals D to F. With further reference to FIGS. 3 and 6 for example during clock cycle T5 both RAMs 26, 28 receive via lines 31a to 31C a high pulse G4, a low pulse H3 and a high pulse I2, corresponding to slightly delayed pulses D4, E3 and F2, respectively. As it will be described in more detail with reference to flow charts shown in FIGS. 7 and 8, both RAMs 26, 28 utilize these high and low pulses, corresponding to previous decision values, to adjust the threshold for comparison with a new pulse Ak to be received on line 14. It is further seen from these Figures that there is one clock delay between an Ak value on line 14 and a clocked decision value Dk on line 34a, resulting from threshold comparison with that value Ak. Therefore, for determining threshold adjustment, for example during clock cycle T5, in addition to previous decisions D4, E3 and F2, it is also necessary to consider a next decision D5, immediately following decision D4. As it is seen from FIG. 6, decision D5 will result from threshold comparison with amplitude value A4 received during clock T4. As it has been previously described, in accordance with an important feature of the invention, each RAM 26, 28 provides a threshold adjustment based on the previous decision values D4, E3, F2, and an assumed value D5, corresponding to a next decision as it will also follow from the flow charts. During each decision making step RAM 26 assumes that D5= −1, while RAM 28 assumes that D5= +1. The resulting adjusted threshold value Z provided by RAM 26 is applied on line 42 to flip-flop 46, and value L provided by RAM 28 is applied on line 50 to flip-flop 52. Each RAM has an operation delay as it is shown in FIG. 6. In this example during clock cycle T5 the adjusted threshold values on lines 42, 50 are Z5= −1, L5= −3, as it will be also described with reference to the flow charts. At the next clock T6 each value Z5, L5 on lines 42, 50, is clocked via respective flip-flops 46, 52, and the resulting clocked values M6= −1, N6= −3 are applied via lines 48, 56 to respective inputs of multiplexer 24. Thus during clock cycle T6 these values M6, N6 are ready and awaiting selection by the actual most recent decision value D5 on line 34a. As it is seen from FIG. 6, in the present example the actual value D5= −1, that is a logic low value, and therefore that signal selects the clocked output signal provided by RAM 26 on line 48. Thus during clock cycle T6 the adjusted threshold value M6= −1 is applied as signal B6 to the adder 16.

It follows from the foregoing description with reference to FIGS. 3 and 6 that the output signals M, N from the first loop L1 are ready for use by Loop L2, before the next decision occurs on line 34a. Because that next decision does not need to access the RAMs, and instead, it only selects the correct threshold value from the values M, N pre-calculated by the RAMs, and applies that value to the magnitude comparator 16, the time necessary for providing a decision is substantially shortened. It is an important advantage that the decision feedback decoder of the invention performs two major operations, that is threshold adjustment and threshold comparison substantially simultaneously during each clock cycle, thereby allowing the operation to run approximately twice as fast when comparing to systems which perform these operations in a sequential manner. It is an additional advantage that the RAMs are not utilized for threshold comparison and therefor the requirement for memory space is limited to that needed for threshold adjustment.

Now operation of the first logic circuit 26, implemented by RAM 1 in the embodiment of FIG. 3 will be described with reference to the flow chart shown in FIG. 7, followed by the description of operation of the second logic circuit 28, implemented by RAM 2, with reference to flow chart of FIG. 8. As it has been described before, logic circuit 26 provides threshold adjustment based on a predetermined number of previous decisions stored in shift register 32, while assuming that the next decision to be made and utilized for the threshold adjustment, will have a value D= −1. Flow chart of FIG. 7 shows the sequence of steps performed by the logic circuit 26 to obtain that adjusted threshold value.

As it has been described before, TABLE A shows amplitude values Ck obtained in response to a positive input pulse Ik= +1, for the particular transmission channel having a response as shown in FIGS. 3A, 3B. The values Ck obtained in response to Ik= −1 are inverted with respect to those shown in TABLE A. Therefore it will be understood that when compensating for intersymbol interference resulting from an input pulse Ik= +1, the adjustment values Ck will be added to the threshold, and the same values Ck will be subtracted from the threshold when compensating for the intersymbol interference resulting from an input pulse Ik= −1.

As it is seen from the previously described channel characteristic shown in FIG. 4B, and from the timing diagram of FIG. 6, in response to a negative input pulse Ik= −1 applied to the transmission channel at time T0, there is a one clock cycle delay for receiving a corresponding negative, response value C1= −5 at time T1 at the channel output. However, due to the channel intersymbol interference, there are other, undesirable interference terms C2 to Cn which are compensated for by adjusting the threshold. As has been described before, the logic circuits 26, 28 compensate for the intersymbol interference by adjusting the threshold value such a way that at each point in time T0 to Tn the corresponding actual values C2 to Cn are added to or subtracted from the threshold value, as will follow from the flow charts described below.

Figure 7:
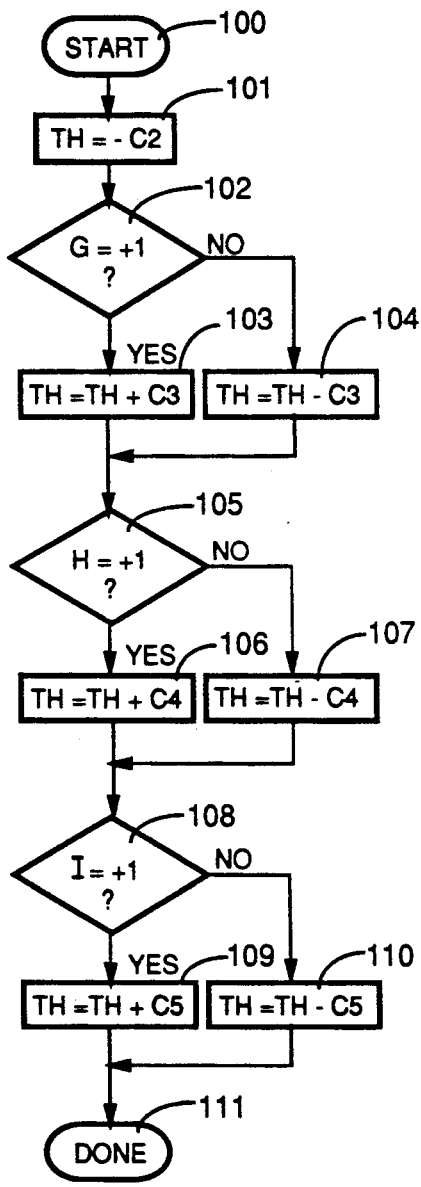
FIGS. 7 and 8 are flow charts depicting the respective operations of the logic circuits 26, 28 utilized in the preferred embodiment of FIGS. 2 and 3.

With further reference to the flow chart of FIG. 7, after initialization depicted by block 100, logic circuit 26 sets the threshold value TH= −C2. As it has been previously described, circuit 26 assumes that the next decision to be obtained and considered for threshold adjustment will be D= −1. Therefore, the first amplitude will be +C2, as it is also seen form FIG. 4B. That value +C2 is substracted form the threshold, as it is depicted by block 101. Because in this example the initial value of the threshold is TH=0, the adjusted threshold value will be TH=−C2.

Thereafter block 102 determines whether the last previously made decision is G=+1 or G=−1. In case G=+1 the next adjustment value C3 will be added to the threshold, as it also follows from FIG. 4A, and it is depicted by block 103. If G=−1 the value C3 will be subtracted from the previously adjusted threshold, as it is shown by block 104 and is apparent from the channel characteristic shown in FIG. 4B.

With further reference to block 105 it determines whether decision H, immediately preceding decision G, is H=+1 or H=−1. As it is shown by block 106 and follows from FIG. 4A, when H=+1 the adjustment value C4 is added to the adjusted threshold, otherwise it is subtracted therefrom, as it is shown by block 107 and follows from FIG. 4B.

Block 108 determines whether decision I which immediately preceded decision H is I=+1 or I=−1. When I=+1, adjustment value C5 is added to the previously adjusted threshold, otherwise it is subtracted therefrom as it is depicted by blocks 109, 110, respectively, and as it also follows from FIGS. 4A and 4B. It will become apparent that in the presently described example C5=0, and therefore the operation depicted by blocks 108 to 110 may be deleted. However, generally for channel characteristics different from those depicted in FIGS. 4A, 4B, it may be necessary to provide threshold adjustment utilizing a greater number of adjustment values than shown in FIG. 7. In that case the flow chart in FIG. 7 will be extended by additional blocks providing additional steps in accordance with the foregoing description.

The thusly adjusted threshold value resulting from the flow chart of FIG. 7 is applied from the logic circuit 26 on line 42 as output signal Z, and it is clocked via flip-flop 46. The resulting clocked signal M on line 48 is applied to multiplexer 24, as previously described.

Figure 8:
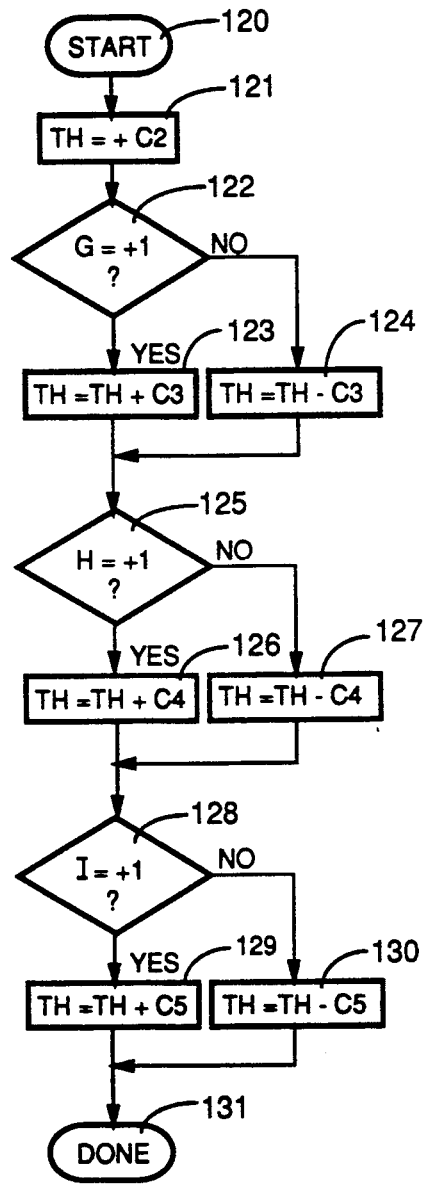

With further reference to the flow chart depicted in FIG. 8, it shows operation of the second logic circuit 28 which assumes that the next decision to be provided by the circuit of FIG. 3 will be D=+1. As it is seen from the transmission channel characteristic of FIG. 4A, the first threshold compensation value in this case is C2=−1. Consequently, that value C2 is added to the initially zero threshold value, as it is depicted by block 121. Thereafter, the value of the last previously provided decision G is determined by block 122.

It is seen from comparison that starting with block 122 the operation of the flow charts shown in FIGS. 7 and 8 is identical. That is, the above-described operation of the first logic circuit 26 as depicted by blocks 102 to 111 in the flow chart of FIG. 7 is identical with the operation of the second logic circuit 28 depicted by blocks 122 to 131 of the flow chart shown in FIG. 8. Therefore, that portion of the operation of circuit 28 which is the same as in FIG. 7 will not be described to avoid repetition.

It will become apparent from the foregoing description that the flow charts of FIGS. 7 and 8 may contain further steps which may adjust the threshold by further compensation values Ck, depending on the particular channel characteristics. It will also be understood that the above-described operations depicted by flow charts of FIGS. 7 and 8 are repeated for each new decision provided by magnitude comparator 16.

While the invention has been shown and described with particular reference to a preferred embodiment thereof, it will be understood that variations and modifications in form and details may be made therein without departing from the scope of the invention as defined in the appended claims.

We claim:

1. A decoder for providing decisions determining sample values of a digital data stream transmitted through a channel, comprising:

means for providing magnitude comparison having a first input for receiving sequentially said sample values corresponding to data transmitted through said channel, and a second input for receiving an adjustable threshold for comparing each sample value to said threshold, said means providing decisions determing each of said sample values as having a first signal value when said sample value exceeds said threshold, and a second signal value when said sample value is equal to or below said threshold;

means for storing a predetermined number of decisions provided by said means for providing magnitude comparison;

first and second threshold adjustment circuits each receiving said predetermined number of stored decisions and in response thereto providing a respective adjusted threshold value, said first threshold adjustment circuit providing said adjusted threshold value based on a first predetermined signal value assigned to a next decision in sequence, following said stored decisions, and said second threshold adjustment circuit providing said adjusted threshold value based on a second predetermined signal value assigned to said next decision in sequence, following said stored decisions; and switch means having a selection input for receiving an actual value of said next decision from said means for providing magnitude comparison, and in response thereto applying to said second input of said means for providing magnitude comparison that one of said adjusted threshold values which is based on said actual value of said next decision.

2. The decoder of claim 1 wherein:

said received sequential sample values have digital values, each said decision provided by said means for magnitude comparison is equal to a first logic level when said digital sample value exceeds said threshold, and each said decision is equal to a second logic level when said digital sample value is equal to or below said threshold;

said first and second threshold adjustment circuits are respective logic circuits; and wherein said first logic circuit provides said adjusted threshold value based on a first logic level assigned to a next decision in sequence, following said stored decisions, and said second logic circuit provides said adjusted threshold value based on a second logic level assigned to said next decision in sequence, following said stored decisions.

3. A decoder for providing decisions determining bit values of a digital data stream transmitted through a channel, comprising:

means for providing magnitude comparison having a first input for receiving sequential digital values corresponding to data bits of said data stream transmitted through said channel, and a second input for receiving an adjustable threshold for comparing each said digital value to said threshold, said means providing decisions determining the value of each said data bit as having a first logic level when said digital value exceeds said threshold, and a second logic level when said digital value is equal to or below said threshold;

means for storing a predetermined number of decisions provided by said means for providing magnitude comparison;

first and second logic circuits, each receiving said predetermined number of stored decisions and in response thereto providing a respective adjusted threshold value, said first logic circuit providing said adjusted threshold value based on a first logic level assigned to a next decision in sequence, following said stored decisions, and said second logic circuit providing said adjusted threshold value based on a second logic level assigned to said next decision in sequence, following said stored decisions; and switch means having a selection input for receiving an actual value of said next decision from said means for providing magnitude comparison, and in response thereto applying to said second input of said means for providing magnitude comparison that one of said adjusted threshold values which is based on said actual value of said next decision.

4. The decoder of claim 3 wherein said means for storing is a shift register means having a predetermined number of series connected storage elements for delaying said decisions for one clock cycle, each storage element having an output for applying said delayed decision therefrom, and wherein said output of a first said series connected storage element is coupled to said selection input of said switch means and said outputs of a second and subsequent series connected storage elements are coupled to said first and second logic circuit, respectively.

5. The decoder of claim 3 wherein said means for providing magnitude comparison comprises adder means for providing a sum of a digital value received at its first input and of an adjusted threshold value received at its second input, and wherein said decision is equal to said first logic level when said sum is greater than zero, and to said second logic level when said sum is equal to or less than zero.

6. The decoder of claim 3 wherein the first and second logic means comprise random access memory means.

7. A decoder for providing decisions determining bit values of a digital data stream transmitted through a channel, comprising:

means for providing magnitude comparison having a first input for receiving sequentially digital sample values corresponding to data bits of said transmitted data stream at a predetermined clock frequency, and a second input for receiving an adjustable threshold, said magnitude comparison means comparing each said digital sample value to said threshold, and providing subsequent decisions determining the value of each said data bit as having a first logic level when said digital sample value exceeds said threshold, and a second logic level when said digital sample value is equal to or below said threshold;

shift register means for storing a predetermined number of consecutive decisions provided by said means for providing magnitude comparison, said shift register means having a predetermined number of series connected storage elements for delaying said consecutive decisions for one clock cycle;

first and second logic circuits, each receiving said predetermined number of stored decisions and in response thereto providing simultaneously a respective adjusted threshold value, said first logic circuit providing said adjusted threshold value based on a first logic level assigned to a next decision in sequence, following said stored decisions, and said second logic circuit providing said adjusted threshold value based on a second logic level assigned to said next decision in sequence following said stored decisions; and switch means having a selection input for receiving an actual value of said next decision from said means for providing magnitude comparison, and in response thereto applying to said second input of said means for providing magnitude comparison that one of said adjusted threshold values which is based on said actual value of said next decision; and wherein each said storage element of said shift register means has an output for applying a delayed decision therefrom, said output of a first said series connected storage element is coupled to said selection input of said switch means and said outputs of all storage elements are coupled to said first and second logic circuits, respectively.

8. A method of providing decisions determining bit values of a digital stream transmitted through a channel, comprising the steps of:

applying sequentially signal samples corresponding to said data stream transmitted through said channel, to a means for providing magnitude comparison;

comparing by said means each sample value to a threshold and providing subsequent decisions determining the value of each bit of said data stream as having a first predetermined signal value when said sample value exceeds said threshold, and a second predetermined signal value when said sample value is equal to or below said threshold;

storing a predetermined number of consecutive decisions;

applying said predetermined number of stored decisions to a first and a second threshold adjustment circuit;

adjusting said threshold by said first and second threshold adjustment circuits, respectively, while assuming by said first threshold adjustment circuit that a respective next decision following said stored decisions, will have a first signal value, and assuming by said second threshold adjustment circuit that a respective next decision following said stored decisions will have a second signal value; and selecting that one of said adjusted threshold values for said comparison step which is based on an actual value of said next decisions.

9. A method of providing decisions determining sample values of a digital data stream transmitted through a channel, comprising the steps of:

applying sequentially the digital sample values to a means for providing magnitude comparison;

comparing by said means each said digital sample value to a threshold and providing subsequent decisions determining the sample value as having a first logic level when said digital sample value exceeds said threshold, and a second logic level when said digital sample value is equal to or below said threshold;

storing a predetermined number of consecutive decisions;

applying said predetermined number of stored decisions to a first and a second logic circuit;

adjusting by said first and second logic circuits said threshold value, respectively, while assigning by said first logic circuit a value equal to said first logic level to a next decision in sequence, following said stored decisions, and assigning by said second logic circuit a value equal to said second logic level to said next decision; and selecting that one of said adjusted threshold values for said comparison step which is based on an actual value of said next decision.

* * * * *